United States Patent [19]
Kagan

[11] Patent Number: 5,093,048
[45] Date of Patent: Mar. 3, 1992

[54] REJACKETING A SPLICED FIBER OPTIC CABLE

[75] Inventor: Gamliel A. Kagan, Brooklyn, N.Y.

[73] Assignee: Grumman Aerospace Corporation, Bethpage, N.Y.

[21] Appl. No.: 390,309

[22] Filed: Aug. 7, 1989

[51] Int. Cl.$^5$ .............................................. B29D 11/00
[52] U.S. Cl. ...................................... 264/1.4; 264/1.5; 264/36; 264/230; 425/174.4
[58] Field of Search ................. 264/1.5, 36, 1.4, 22, 264/230; 425/13, 108, 808, 174.4; 156/49; 65/4.21

[56] References Cited

U.S. PATENT DOCUMENTS

| | | | |
|---|---|---|---|
| 4,131,404 | 12/1978 | Dubost | 264/1.5 |
| 4,410,561 | 10/1983 | Hart, Jr. | 264/1.5 |
| 4,525,312 | 6/1985 | Jones | 264/1.5 |
| 4,526,732 | 7/1985 | Kakii et al. | 264/1.5 |
| 4,662,307 | 5/1987 | Amos et al. | 264/1.5 |
| 4,822,434 | 4/1989 | Sawaki et al. | 264/22 |

FOREIGN PATENT DOCUMENTS 123505 6/1986 Japan ........................... 264/1.5

Primary Examiner—James Lowe
Attorney, Agent, or Firm—Pollock, VandeSande & Priddy

[57] ABSTRACT

After fusion splicing of optical fibers, the splice area is positioned within a two-part transparent mold. Light-curable epoxy is injected into the mold and surrounds the splice area. A visible light source shines through the mold, which is preferably made of transparent plexiglass, thus allowing the epoxy to harden. The mold is opened and the rejacketed cable is removed. In order to ensure that the original jacket material at the cable ends does not separate from the epoxy rejacketing material, a heat-shrinkable tube may be installed over the rejacketed splice area.

4 Claims, 1 Drawing Sheet

REJACKETING A SPLICED FIBER OPTIC CABLE

FIELD OF THE INVENTION

The present invention relates to fiber optic repair, and more particularly to a method and apparatus for rejacketing a spliced fiber optic cable.

BACKGROUND OF THE INVENTION

In various types of robotic mechanisms, remote control is achieved via a fiber optic cable. In one application a robotic vehicle is remotely controlled from a control station via fiber optic cable. There must be a spool of fiber optic cable which pays out the cable as the vehicle moves away from the control station. Since the paid-out cable may snag on something resting on the ground, it is conceivable that the cable will break. When the vehicle is retrieved, a repair must be made to the broken cable. It is possible to fuse together the broken glass fiber core by means of conventional fusible splicing. However, since the fiber optics are fragile, it is necessary to rejacket the splice area after the broken ends are spliced together. Prior to the present invention, the conventional method for rejacketing the fiber has been with a hard tube that is typically two inches long and which is epoxied into place over the splice area. This method does not operate satisfactorily where a spool pays out a cable due to the fact that the hard tube cannot conform with the circumference of the spool. Further, the tube cannot pass through the fiber optic cable spool pay-out mechanism.

BRIEF DESCRIPTION OF THE INVENTION

Because of the present problems with rejacketing spliced fiber optic cables, it is necessary to provide a means of rejacketing the spliced fiber optic cable with a flexible jacket that will have no problem in conforming to the circumference of the spool as well as being able to easily pass through the pay-out mechanism of a supply spool. The present invention offers this capability after a fiber optic cable is fusion spliced. With the present invention, a plexiglass two-part mold allows insertion of a spliced fiber optic cable in need of rejacketing. Light-curable epoxy is then introduced into the mold; and when an appropriate light source shines through the epoxy-filled transparent mold, the material hardens around the splice area to achieve rejacketing. The resultant rejacketing epoxy material is flexible and is capable of assuming the contour of the spool as well as passing easily through the pay-out mechanism of the spool.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Prior to a discussion of the rejacketing procedure of the present invention, it will be worthwhile to briefly explain the process of fusion splicing which is a conventional technique for splicing optic fibers together. Typically, when a fiber optic cable is fusion spliced, 1.5 inches of jacketing is removed on each end of the broken cable so as to allow insertion of the two cable ends into a fusion splice machine which is widely used. The machine melts together the two broken ends of glass fiber to form one continuous fiber which has the integrity of a new fiber. Once the fiber is removed from the splice machine, there is a three-inch gap in the jacketing around the glass fiber because of the stripped jacket.

The present invention allows the immediate insertion of a fusion spliced cable into a plexiglass two-part mold for purposes of injecting an epoxy material around the unjacketed area which, when hardened, will still have sufficient resiliency and structural integrity to function as the original jacketing material.

Figure 1:
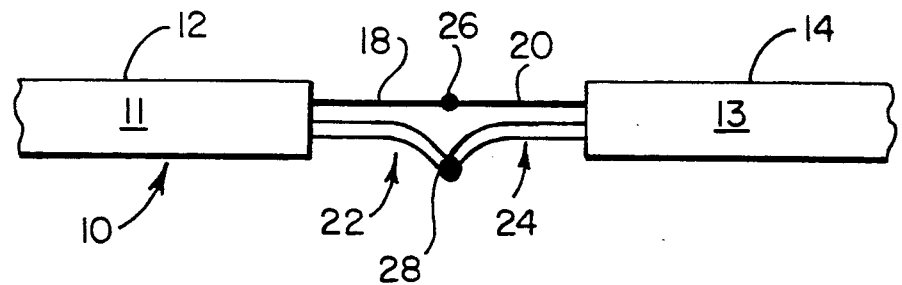
FIG. 1 is a view of a spliced fiber optic cable that is ready for rejacketing in accordance with the present invention.

FIG. 1 illustrates a fusion spliced fiber optic cable, generally indicated by reference numeral 10. The cable comprises two ends 12 and 14 spliced together. Each cable end customarily is characterized by a plastic jacket 11, 13 from which the fiber optics 18 and 20 extend to a splice point 26. Along with the fiber optics there generally exists KEVLAR strands within the jacket to provide tensile strength to a finished cable. When a cable needs to be spliced, the strands will most often require reconnection as well and this can be easily accomplished by applying a drop of cyanoacrylate material (e.g. LOCKTITE 495) to the adjoining ends of the KEVLAR strands as indicated by reference numeral 28. The result will be a connection 28 of the previously disconnected strands 22 and 24 to form a continuous strand length that will once again provide tensile strength to spliced cable ends.

To this point, the technique outline is prior art. However, once the cable ends have been successfully connected, it becomes necessary to rejacket the spliced area since exposed fiber optics are far too fragile to be wound and paid out from a reel. Thus, the present invention provides the means for rejacketing the spliced cable ends in a manner dressing the cable ends compactly and with sufficient resilience so that the fiber optic in the spliced area can be wound.

Figure 2:
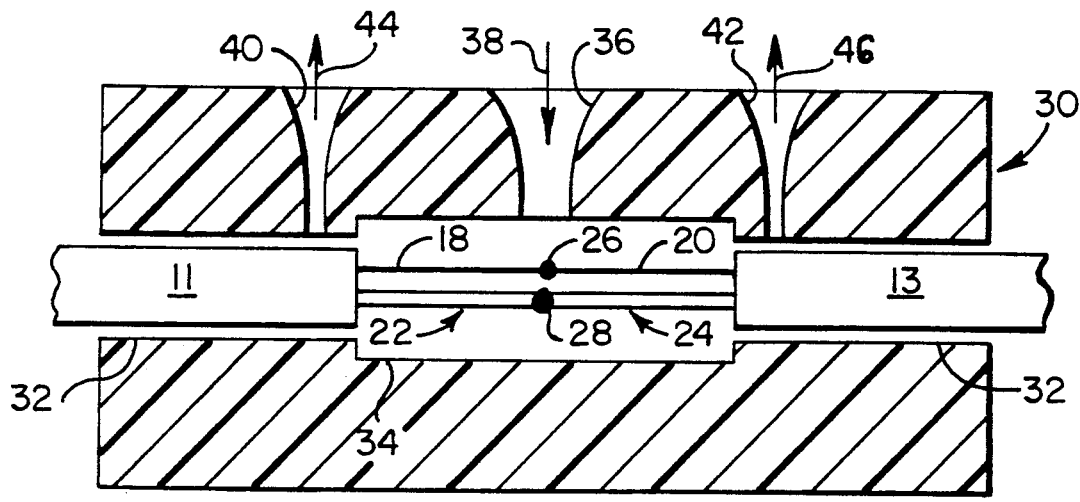
FIG. 2 is a longitudinal diagrammatic sectional view through a mold containing the spliced cable just prior to rejacketing in accordance with the present invention.
Figure 3:
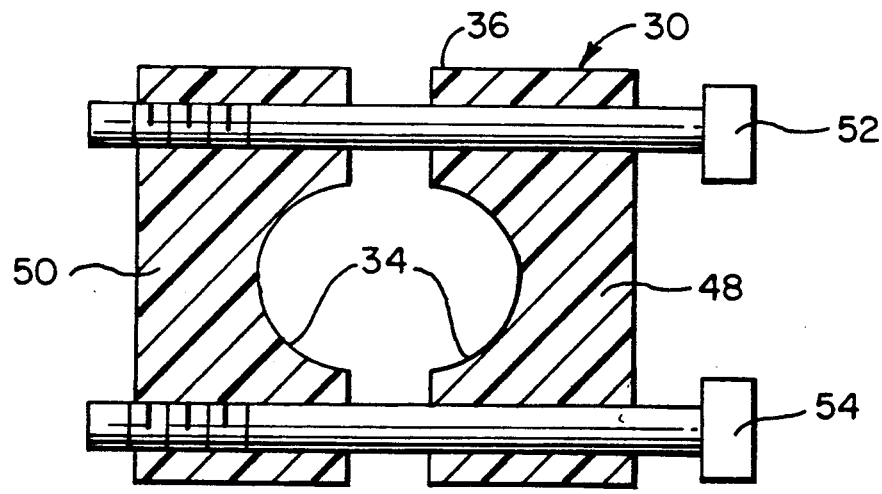
FIG. 3 is a transverse diagrammatic sectional view of the mold and spliced cable prior to rejacketing.

FIG. 2 illustrates a simplified diagrammatic view of a two-part mold 30 shown in transverse cross section in FIG. 3. The mold 30 includes spaced cylindrical passageways 32 for securely clamping the jacketed cable ends in place. Interior ends of the passageways 32 open into a central enlarged cylindrical chamber 34 through which extend the spliced fiber optics 18 and 20 as well as the connected KEVLAR strands 22 and 24. An inlet 36 is formed in the body of the mold and communicates with the central chamber 34. The inlet allows the introduction (38) of epoxy material into the central chamber which will surround the exposed fiber optic and strands while the spliced cable lies at an axial position through the chamber. Vent holes 40 and 42 are formed in the mold at opposite ends of the central chamber and at points interfacing with the interior end of passageways 32. The holes permit the escape of trapped air during introduction of epoxy, as indicated by the arrows 44 and 46.

The mold is preferably fabricated from a transparent plastic material such as LUCITE. Light-curable epoxy (preferably visible light) is used with a 450 nm visible light source, such as Model E505 of Electro-Light Corp. of Danbury, Conn. The light-curable epoxy such as is manufactured by Epolin, Inc., of Newark, N.J. When exposed to light it will only take two minutes for epoxy to cure thereby permitting removal of the rejacketed cable from the mold. Then, any remaining flashing is trimmed off.

It should be mentioned here that, although FIGS. 1 and 2 illustrate a single fiber optic, this is for purposes of simplifying the drawings and the description. It is to be understood that several such fiber optics may be included within a cable and the rejacketing thereof would be performed in the same manner as just outlined.

FIG. 3 illustrates a basic two-part mold which may be employed to accomplish the present invention. The mold 30 may be comprised of two halves 48 and 50 having interior cut-outs which form the passageways 32 and the central chamber 34 as well as the inlet 36 and vent holes 40 and 42. The confronting interface of the mold halves are clamped together by means of suitable fasteners 52 and 54 after a spliced cable is positioned therethrough. This will then allow the introduction of the hardenable material into the chamber 34 for subsequent hardening and the formation of a jacket over the spliced area.

In order to ensure that the rejacketed portion remains fixed over the splice area, it may be desirable to cover the cured epoxy material in the splice area with a short length of heat-shrinkable tubing. This heat shrinkable material will extend across the splice area and will adhere to the adjoining sections of the original jacket material thereby preventing the original jacket material from separating from the splice area when oppositely directed tensile forces are applied to the cable.

Thus, as has been described, the present invention enables a complete repair of a broken fiber optic cable. Specifically, the present invention enables the rejacketing of a spliced end so as to provide protection and strength to the splice area as well as enabling flexing of the cable in the rejacketed section to allow a cable to be wound and paid out from a reel for an indefinite number of times without mechanical failure at the splice area.

Although the present invention has thus far been described in terms of a fiber optic cable, it should be understood that the rejacketing procedure is equally applicable to other types of cable where the cable jacket must be stripped back from a splice area in order to allow the splice to be made.

It should be understood that the invention is not limited to the exact details of construction shown and described herein for obvious modifications will occur to persons skilled in the art.

I claim:

1. A method for rejacketing a spliced fiber optic cable having sections of jacket removed from a splice area, the method includes the steps:
    positioning the splice area of the cable within a transparent mold central chamber;
    clamping jacketed portions of the cable between two mating mold members;
    injecting a light-curable bonding material in to the chamber for surrounding the splice area;
    venting the chamber of air as the bonding material is injected;
    exposing the mold to a light source for curing the material contained therein and forming a new flexible jacket over the splice area which is continuous with the original jacket; and
    removing the rejacketed cable from the mold.

2. The method set forth in claim 1 wherein the material is curable by visible light.

3. The method set forth in claim 1 together with a final step of heat shrinking a tube over the rejacketed area and a portion of the original jacket for preventing separation of the original jacket ends from the new jacket existing in the splice area.

4. A method for rejacketing a fiber optic cable having sections of jacket removed from a splice area, the method including the steps:
    positioning the splice area of the cable within a transparent mold central chamber;
    clamping jacketed portions of the cable between two mating mold members;
    injecting a light-curable epoxy bonding material into the chamber for surrounding the splice area;
    venting the chamber of air as the epoxy material is injected;
    exposing the mold to a source of visible light for curing the material and forming a new flexible jacket over the splice area which is continuous with the original jacket; and
    removing the rejacketed cable.

* * * * *